May 8, 1962 C. H. COLEMAN 3,034,065
ELECTRONIC SWITCHING APPARATUS
Filed Sept. 12, 1958
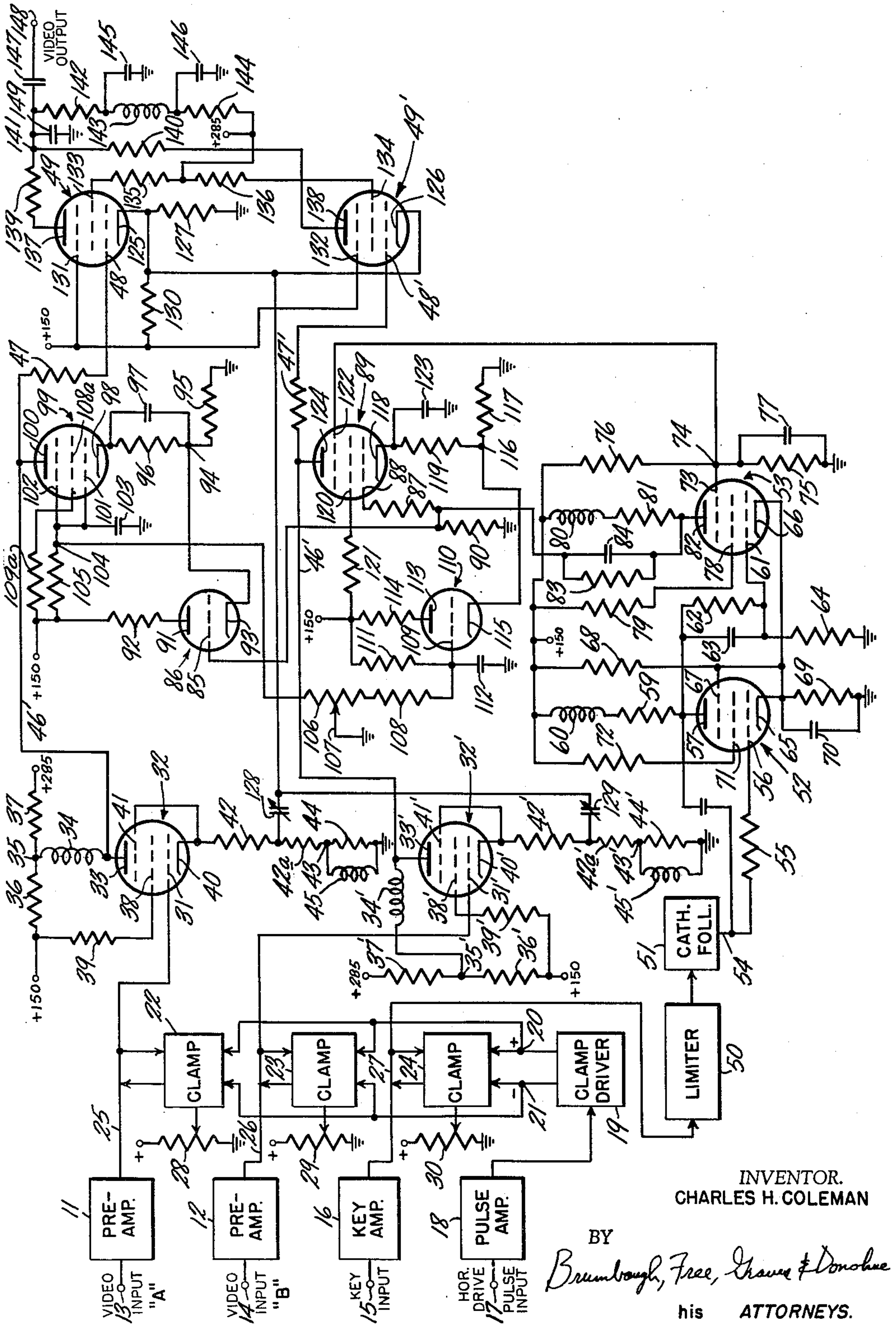
INVENTOR.
CHARLES H. COLEMAN
BY
Brumbaugh, Free, Graves & Donohue
his ATTORNEYS.

United States Patent Office 3,034,065

Patented May 8, 1962

3,034,065

ELECTRONIC SWITCHING APPARATUS

Charles H. Coleman, Chicago, Ill., assignor to Columbia Broadcasting System, Inc., New York, N.Y., a corporation of New York Filed Sept. 12, 1958, Ser. No. 760,665
5 Claims. (Cl. 328—154)

This invention relates to electronic switching apparatus and, more particularly, to a new and improved switching circuit for selecting either of two video input signals for transmission to an output channel.

Heretofore, the electronic switching of video signals in response to the amplitude of a keying signal has required multigrid switching tubes in each video channel wherein a video is applied to one grid and the keying signal to another grid of the same tube. Inasmuch as two separate multigrid tubes are utilized, exact synchronization of the switching actions in both channels is difficult and extremely rapid switching rates are not possible. Furthermore, systems of this type tend to be unstable and nonlinear.

Accordingly, it is an object of this invention to provide new and improved electronic switching apparatus characterized by improved stability and linearity.

Another object of the invention is to provide switching apparatus of the above type wherein a large amount of current feedback may be utilized.

Still another object of the invention is to provide switching apparatus capable of switching from one channel to the other at an extremely rapid rate.

A further object of the invention is to provide electronic switching apparatus wherein the switching signals operative to select one of the video signals have time overlap which is adjustable to insure that the switching action takes place at exactly the same time in both channels.

These and other objects of the invention are accomplished by adding a switching signal to the video signal in each channel and applying the sum of these signals to the control grid at a conventional electron tube which transmits the video signal to an output channel whenever the switching signal does not cut off the tube. The switching signals for both channels are derived from a keying signal by clipping the keying signal from opposite directions. An adjustable overlap from the switching signals is provided by overlapping the time lag between the clipping actions. In one embodiment of the invention, a video signal amplifier and a key signal clipper are connected to add their output signals and the sum signal is applied to the grid of a switching tube, the switching tubes in both channels being connected to a common video output channel.

Further objects and advantages of the invention will be apparent from a reading of the following description in conjunction with the accompanying drawing which illustrates the schematic circuit diagram of a typical switching apparatus arranged according to the invention.

As illustrated in the drawing, a representative switching circuit comprises a pair of conventional preamplifiers 11 and 12 having input terminals 13 and 14 for receiving two different video signals "A" and "B," respectively. In the illustrated embodiment of the invention, the two amplifiers 11 and 12 are preferably arranged to amplify the corresponding video signals to a ten volt peak-to-peak level. Through another input terminal 15, a keying signal is applied to another conventional amplifier 16 while the horizontal video drive pulses are received at a terminal 17 and amplified by a pulse amplifier 18. According to the usual custom, a keying signal is arranged to select either of the two video signals according to its voltage level.

In order to maintain the proper voltage relationships between the two video signals "A" and "B" and the keying signal within the switching circuit, the horizontal drive pulses from the amplifier 18 are utilized to actuate a conventonal push-pull type clamp driver 19 generating equal positive and negative pulse signals at two output terminals 20 and 21, respectively, in response to each input pulse. These signals are applied to three clamp circuits 22, 23, and 24, which are arranged in the usual manner to establish a voltage level at each of the output conductors 25, 26, and 27 of the three amplifiers 11, 12, and 16, respectively, before each horizontal sweep. The voltage levels corresponding to picture black signals, for example, are established for the two video channels "A" and "B" by potentiometers 28 and 29 adjustable to supply the appropriate potential to the clamps 22 and 23, respectively, while the setting of a potentiometer 30 determines the proper level for the clamp 24.

In the "A" video signal channel, a conductor 25 leads to the control grid 31 of a pentode amplifier 32. This tube, which may be of the type designated 6485, for example, has its plate electrode 33 connected through a choke 34 to the junction 35 of two resistors 36 and 37 connected to 150 volt and 285 volt positive sources, respectively, for example. The resistors 36 and 37 are in the ratio of about thirty to one, holding the junction 35 near the 150 volt level, the resistor 36 being the principal load resistor and the resistor 37 a bleeder resistor, while the choke 34 is a high frequency compensating coil utilized to adjust the transient response of the keying signal as seen at the cathode 33. The couple cathode 40 and suppressor 41 of the tube 32 are joined through two series resistors 42 and 42*a* to a junction 43, which is in turn connected to ground through a parallel resistor 44 and choke 45. From the plate electrode 33, output signals from the amplifier 32 are carried by a conductor 46 through a series resistor 47 to the control grid 48 of a switching amplifier 49.

In a similar manner, clamped video signals on the conductor 26 of the "B" channel are carried to the control grid 31' of an amplifier 32' while the output signals therefrom are carried through a conductor 46' and a series resistor 47' to the control grid 48' of another switching amplifier 49'. Inasmuch as the circuit of the amplifier 32' is identical in all respects with that of the amplifier 32, it will not be described in detail herein, the corresponding elements thereof being indicated by primed reference numerals in the drawing.

In the key circuit, the keying signal is carried through a conventional limiting circuit 50 and a cathode follower 51 to a fast-acting binary pair of pentodes 52 and 53 which convert the key signal to a substantially rectangular waveform having constant predetermined rise and fall time. Thus, the cathode follower output 54 is connected through a resistor 55 to the control grid 56 of the first tube 52, the plate electrode 57 thereof also being linked to the output 54 through a capacitor 58. In addition, the plate electrode 57 of this tube is linked to a 150 volt positive source through a series resistor 59 and choke 60 and to the control grid 61 of the tube 53 through a parallel resistor 62 and capacitor 63, a grid bias resistor 64 shunting the control grid 61 to ground.

Both the cathode electrodes 65 and 66 of the pentodes 52 and 53 and the suppressor grid 67 of the tube 52 are joined to the 150 volt positive source through a resistor 68 and to ground through a parallel resistor 69 and capacitor 70 to bias the cathodes at a predetermined level. From the screen grid 71 of the tube 52, a small resistance 72 is connected to the 150 volt source. Connected to the suppressor grid 73 of the pentode 53, the junction 74 of two resistors 75 and 76 holds this grid at a level approximately midway between ground and the 150 volt source to which they are respectively joined, the resistor 75 being shunted to ground by a capacitor 77. The screen grid 78 of this pentode is joined to the positive voltage source through a resistor 79 while a series choke 80 and a resistor 81, connected between the positive source and the plate electrode 82, comprise the plate load for this tube.

Both the binary tubes 52 and 53 may be of the type designated 6485, for example, and the circuit elements described above are preferably selected so that the "on" and "off" thresholds of the pair are separated by a constant amplitude which may be slightly less than 10% of the normal key signal amplitude supplied from the cathode follower 51. In this manner, the circuit discriminates against noise and undesired signals in the background of the keying signal. Furthermore, the circuit elements are selected to provide the same rate of rise and fall in the output signal in response to increase and decrease in the amplitude of the keying signal, thereby permitting a predetermined time overlap in the resultant switching action. With a fast-acting binary circuit of this type, keying signal frequencies up to five megacycles can readily be handled.

From the plate electrode 82 of the second pentode of the binary pair, shaped keying signals are transmitted through a parallel resistor 83 and capacitor 84 to the control grid electrode 85 of a triode 86 in the "A" signal channel and also through a resistor 87 to the control grid 88 of a pentode 89 in the "B" signal channel, the grid electrode 85 being connected to ground through a bias resistor 90. In the "A" signal channel, the plate electrode 91 of the triode 86 is connected through a load resistor 92 to a 150 volt positive source while the cathode electrode 93 of this tube is connected to a junction 94 leading to ground through a resistor 95.

Also connected to the junction 94 through a parallel resistor 96 and capacitor 97 is the cathode electrode 98 of a pentode tube 99, the plate electrode 100 of this tube being joined directly to the "A" channel conductor 46, thereby utilizing the resistor 36 as a plate load in common with the pentode 32 so that the output signals from the pentodes 32 and 99 are added at the conductor 46. Both the control grid electrode 101 and the suppressor grid 102 of this tube are connected to ground through a capacitor 103 and to the junction 104 of a voltage divider comprising a resistor 105 joined to the 150 volt positive source and one portion of a variable resistor 106 having a grounded movable tap 107, the screen grid 108a being connected through a resistor 109a to the positive source.

At its other end, the resistor 106 is connected through a resistor 108 to the grid electrode 109 of a triode 110, which is joined to a 150 volt positive source through another resistor 111, the grid electrode 109 also being shunted to ground through a capacitor 112. Thus, it will be apparent that the D.C. bias applied to the control grid electrodes 101 and 109 of the pentode 99 and the triode 110 may be varied simultaneously in opposite directions by adjustment of the movable tap 107. Accordingly, the operating levels of the two clipping circuits comprising the tubes 86 and 99 in the "A" channel and 110 and 89 in the "B" channel, which generate two oppositely directed switching signals from the keying signal, may be varied to produce the proper amount of time overlap in the switching signals. Preferably, both the pentodes 89 and 99 are of the 6485 type while the two triodes 86 and 110 may each be one-half of a dual tube, such as the type designated 5687.

The plate electrode 113 of the triode 110 is also connected to the 150 volt positive source through a load resistor 114 while its cathode electrode 115 is connected to a junction 116 leading to ground through a resistor 117 and to the cathode electrode 118 of the "B" channel pentode 89 through a resistor 119. This pentode has its screen grid 120 joined to the 150 volt source through a resistor 121 and its suppressor electrode 122 connected to the voltage divider tap 74 while a capacitor 123 shunts its cathode electrode 118 to ground. Also, the plate electrode 124 of the pentode 89 is joined to the "B" channel video signal conductor 46' thereby adding one of the switching signals derived from the keying signal to the video signal in this channel. The components in each of these clipping circuits are selected so that when one of the pentodes 89 and 99 is conducting to cut off the corresponding video signal, the other pentode is held non-conductive so that it cannot introduce any drift in the selected video signal.

In the next stage of the switching apparatus, the two switching tubes 49 and 49', which may be of the 6136 type, for example, have their couple cathodes 125 and 126 connected to ground through a common resistor 127 and to the junctions of the resistors 42, 42a and 42', 42a', in the cathode circuits of the amplifiers 32 and 32' through two trimmer capacitors 128 and 129, respectively, the cathodes 125 and 126 also being joined to a 150 volt positive source through a resistor 130. Because of the common cathode connection of the two switching tubes 49 and 49' and the push-pull arrangement of the switching signals applied to their grid electrodes from the pentodes 99 and 89, the switching tube 49 or 49' that is conducting provides a holding voltage on the cathode electrode 125 or 126 of the tube that is not conducting. As a result, the cathodes of the two switching tubes do not attempt to follow the keying signals.

The connection between the common cathodes of the switching tubes 49 and 49' and the cathode circuits of the amplifiers 32 and 32' comprises a bridge neutralization circuit which neutralizes the effect of the grid-to-cathode capacitance of the switching tubes. Thus, undesired leak-through of high-frequency components of the video signal that is off is cancelled out by an equal and opposite video signal from the corresponding amplifier 32 or 32'. To this end, the resistors 42a and 42a' are selected so that the signal amplitude at the capacitor 128 or 129 is equal to that at the control grid of the switching tube 49 or 49'. Also, the chokes 45, 45' and resistors 44, 44' are selected so that the high-frequency components of the video signal from the amplifier cathode circuits are 180° out-of-phase with components of the signals at the switching tubes which might leak through because of grid-to-cathode capacitance.

Both the pentodes 49 and 49' have their suppressor grids 131 and 132 joined to the 150 volt source while their screen grids 133 and 134 are connected through identical resistors 135 and 136 to the 285 volt D.C. source. Also, both plate electrodes 137 and 138 of these pentodes lead through like resistors 139 and 140 to a junction 141 which is connected to the 285 volt source through a resistor 142, a choke 143, and another resistor 144 connected in series, the junctions between these elements being shunted to ground through capacitors 145, 146 and 149. The resistor 142, choke 143 and capacitor 145 comprise a roll-off network having transient response characteristics which reduce switching transients and still provide an adequately fast rise time for the switched video signal, while the resistor 144 and capacitor 146 form a low frequency compensating network correcting for low frequency loss in the output circuit. The roll-off of frequency response in the above network is compensated in the usual manner by an increased response at higher frequencies in the preamplifiers 11 and 12. In the switching tube output circuit, the video signal from the "A" or "B" channel, which is transmitted by one of the switching tubes, is detected at the junction 141 and carried through a coupling capacitor 147 to a video output terminal 148.

In operation, amplified and clamped video signals in the "A" and "B" channels are applied to the conductors 46 and 46' from the plate electrodes 33 and 33', respectively, while the keying signals generate output voltage signals having a predetermined rate of rise or fall from the binary pair 52 and 53, as described above. If the output signal at the plate electrode 82 of the pentode 53 is at a low potential, the grid electrode 88 of the clipper pentode 89 is held below cut off and that tubes does not conduct, thereby permitting the "B" channel video signal to be transmitted to the control grid 48' of the switching tube 49' at a potential level within the operating range of the tube. This signal is then amplified by the tube 49' and carried to the video output terminal 148.

At the same time, the control grid electrode 85 of the triode 86 is also held at a low operating level by the key signal thereby holding the potential at the junction 94 at a relatively low level. In this condition the cathode bias of the clipper pentode 99 is low enough with respect to its control grid bias to cause this tube to conduct, decreasing the potential level at the amplifier plate electrode 33 and at the control grid electrode 48 of the switching tube 49 sufficiently to prevent the switching tube from transmitting the "A" channel video signal.

As the key signal shifts to a high amplitude at the constant rate determined by the circuit of the binary pair, the bias on the control grid 88 of the pentode 89 is raised to cause that tube to conduct, thereby dropping the potential of the grid 48' below the operating range of the tube 49 while the triode 86 is raised to a high operating level. Current drawn through the resistor 95 by this triode raises the potential of the junction 94, increasing the cathode bias of the pentode 99 until this tube is cut off, permitting the "A" channel video signal to be carried to the grid 48 of the switching tube 49 at a potential level within the operating range of that tube.

By adjusting the position of the movable tap 107 on the resistor 106, the control grid bias of the tube 99 may be raised at the same time the cathode bias of the tube 89 generated at the junction 116 by operation of the triode 110 is lowered. It will be readily apparent that by lowering the cut off point of the tube 89 and raising the bias of the tube 99 in this manner the switching signals generated by these two circuits may be adjusted to provide the proper overlap in time so that the switching action in the two switching pentodes occurs at exactly the same time. Thus, inasmuch as essentially the same signal is applied to the grid of the pentode 89 and, through the cathode follower action of the triode 110, to the cathode of the pentode 99, these pentodes are effectively driven by the same signal in opposite directions and, therefore, as clippers, pass opposite ends of the input waveform from the binary during the conducting portion of their respective cycles. Since the plate circuit of each of these pentodes is directly connected to the grid of its associated video switch tube (which also clips the keying signal), each keying signal pentode-switch tube pair passes a relatively narrow "slice" of the binary's signal, which is added to the slice from the other pair at the output of the switch tubes. Control of the clipping level of the pentodes 89 and 99, and consequently the location of the resultant slices on the input signal, is arranged in such a way that moving the arm 107 of the potentiometer 106 in one direction increases the clipped signal as seen at the plates of the tubes 89 and 99 simultaneously. At the same time, because of the opposite polarity inputs to the pentodes 89 and 99, the slices of the input signal that are passed move in opposite directions with respect to the grids of the tubes 89 and 110.

Although the output of binary has a very fast rise time, the rise time still has a finite value, and the opposite adjustment of the output slices along this rise time slope allows the relative timing of the outputs to be set so that one output goes off before the other goes on (underlap), the two outputs change simultaneously (matching), or the second goes on before the first can shut off (overlap).

Furthermore, it will be obvious that since very small switching transients are generated by the novel switching apparatus of the invention, none of the usual video overall clipping level adjustments are necessary. Exemplifying the advantages of the apparatus described herein, in a typical circuit the entire switching action can be completed in 0.1 microsecond.

Although the invention has been described herein with reference to a specific embodiment, many modifications and variations therein will readily occur to those skilled in the art. Accordingly, all such modifications and variations are included within the intended scope of the invention as defined by the following claims.

I claim:

1. Electronic switching apparatus for selecting either of two information signals in accordance with the amplitude of a keying signal comprising first channel means carrying one of the information signals, second channel means carrying the other information signal, first amplifier means having grid electrode means receiving the information signal from the first channel means, second amplifier means having grid electrode means receiving the information signal from the second channel means and having a common output with the first amplifier means, clamping means connected to the first and second channel means to maintain the information signals therein normally at a selected level within the operating range of the corresponding amplifier means, first switch signal generating means including vacuum tube means having output means connected to the first channel means and bias control means normally retaining the vacuum tube means in a conductive condition, thereby holding the potential level of the first channel means outside the operating range of the first amplifier means, and responsive to an increase in the amplitude of a keying signal to render the vacuum tube means non-conductive, and second switch signal generating means including vacuum tube means having output means connected to the second channel means and grid electrode means normally biased in a non-conductive condition and responsive to an increase in the amplitude of a keying signal to render the vacuum tube conductive, thereby driving the potential level of the second channel means outside the operating range of the second amplifier means.

2. Electronic switching apparatus according to claim 1 including bridge neutralization means from the first and second channel means to the first and second amplifier means adapted to cancel video signal leakage in the first and second amplifier means.

3. Electronic switching apparatus for selecting either of two information signals in accordance with the amplitude of a keying signal comprising first channel means carrying one of the information signals, second channel means carrying the other information signal, switching tube means for each channel means having common output means, clamping means connected to each of the channel means to maintain the information signals therein normally at a selected level within the operating range of the switching tube means, switch signal generating means for each channel means responsive to an increase in the amplitude of a keying signal to increase the potential level of one of the channel means to a point within the operating range of the corresponding switching tube and to decrease the potential level of the other channel means to a point outside the operating range of the corresponding switching tube, bias control means for each switch signal generating means determining the keying signal amplitude at which the generating means is actuated, and adjusting means for varying both bias control means simultaneously in opposite directions.

4. Electronic switching apparatus for selecting either of two information signals in accordance with the amplitude of a keying signal comprising first channel means carrying one of the information signals, second channel means carrying the other information signal, switching tube means for each channel means having common output means each having grid electrode means receiving the information signal from the corresponding channel, clamping means connected to each of the channel means to maintain the information signals therein normally at a selected level within the operating range of the switching tube means, first vacuum tube means for generating a switching signal and applying it to the switching tube grid electrode means in the first channel, second vacuum tube means for generating a switching signal and applying it to the switching tube grid electrode in the second channel, key signal shaping means providing keying signals having a predetermined rate of change of amplitude, and bias control means responsive to an increase in the amplitude of the keying signal to render one of the vacuum tube means conductive and the other vacuum tube means non-conductive with a predetermined time separation.

5. Electronic switching apparatus according to claim 4 wherein the bias control means is adjustable to increase or decrease the time separation between the activation of one vacuum tube and the deactivation of the other vacuum tube.

References Cited in the file of this patent

UNITED STATES PATENTS

| | | |
|---|---|---|
| 2,300,999 | Williams | Nov. 3, 1942 |
| 2,464,353 | Smith et al. | Mar. 15, 1949 |
| 2,466,207 | Carpenter | Apr. 5, 1949 |
| 2,543,462 | Longmire | Feb. 27, 1951 |
| 2,698,382 | Uglow et al. | Dec. 28, 1954 |
| 2,706,265 | Buehler | Apr. 12, 1955 |
| 2,863,051 | Ackerman et al. | Dec. 2, 1958 |
| 2,867,723 | Spaulding | Jan. 6, 1959 |
| 2,890,332 | Kochevar | June 9, 1959 |

UNITED STATES PATENT OFFICE

CERTIFICATE OF CORRECTION

Patent No. 3,034,065 May 8, 1962

Charles H. Coleman

It is hereby certified that error appears in the above numbered patent requiring correction and that the said Letters Patent should read as corrected below.

Column 1, line 16, after "video" insert -- signal --; line 41, for "at" read -- of --; column 5, line 3, for "tubes" read -- tube --; column 8, line 10, for "Uglow et al." read -- Uglow Jr., et al. --.

Signed and sealed this 4th day of September 1962.

ƷEAL)
ttest:

ҒNEST W. SWIDER
ttesting Officer

DAVID L. LADD
Commissioner of Patents